June 16, 1953     H. J. SLOWEY     2,642,124
HEADREST FOR VEHICLES
Filed Jan. 4, 1952
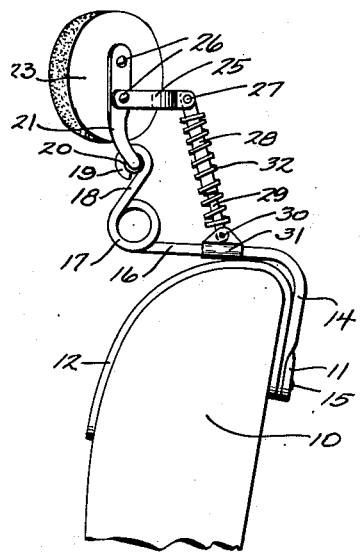
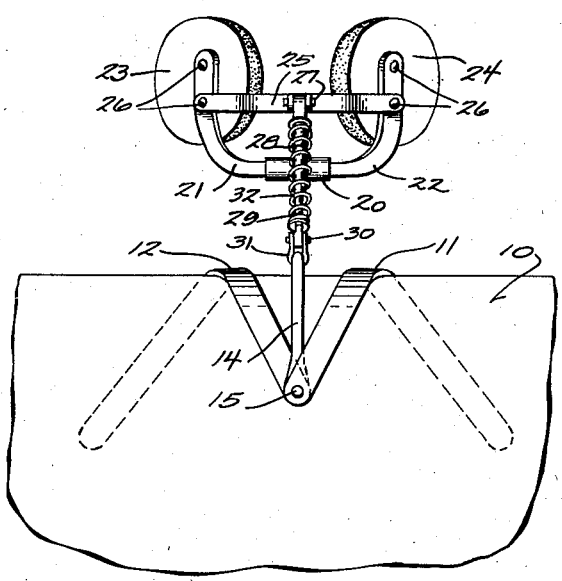
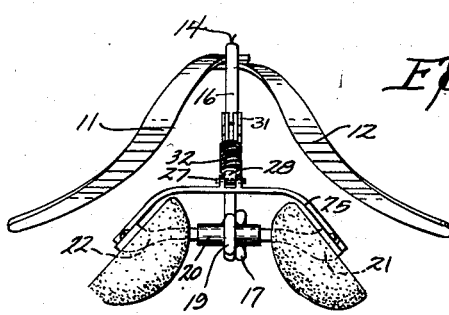
INVENTOR
HERBERT J. SLOWEY
BY Gerald P. Welch
ATTORNEY Patented June 16, 1953

2,642,124

UNITED STATES PATENT OFFICE 2,642,124

HEADREST FOR VEHICLES

Herbert James Slowey, Portage, Wis.

Application January 4, 1952, Serial No. 264,962

2 Claims. (Cl. 155—174)

This invention relates to improvements in head-rests for vehicles and more particularly to a novel head-rest adapted for attachment to a vehicle seat.

It has been found desirable at times, especially in cross-country driving, for two or more persons to alternate in driving and sleeping. Present day automotive vehicles are designed for comfort but are so constructed that it is difficult to sleep by resting the head on the back of the seat while the vehicle is in motion, as all irregularities in the road surface are communicated to the sleeper. The present invention has for its object to support the head of a sleeper while he is in a normal seated position and to insulate it from shocks due to the travelled surface.

Other and further objects of the invention will appear as the description proceeds, reference being had to the accompanying drawings, in which:

Fig. 1 is a side view in elevation of a head-rest embodying the invention attached to the seat of a vehicle.

Fig. 2 is a rear view in elevation of the same.

Fig. 3 is an inverted plan view of the device.

Referring more particularly to the drawings, the numeral 10 refers to the back of a vehicle seat. A pair of arms 11 and 12 engage over the top of the seat back 10 and diverge from their points of connection behind the seat back where they are secured to each other and the upwardly extending bracket 14 by the rivet or other fastening means 15. The bracket 14 has an integral horizontal forwardly extending portion 16 adapted to overlie the top of the seat back 10. The bracket 14 and the integral portion 16 are formed of spring metal having a frontal coil at 17 with a portion 18 extending thereabove terminating in an eye 19 fixedly retaining a tubular member 20 holding the laterally and upwardly extending arms 21 and 22 to which are secured the sponge rubber pads 23 and 24. An angular bar 25 joins the arms 21 and 22, being fixed thereto and to the pads 23 and 24 by threaded or other means 26.

The bar 25 is provided on its rear side with a pivot pin 27 which pivotally engages a telescoping member 28 which latter receives a complementary telescoping member 29 pivotally connected with a pin 30 held on a sleeve 31 affixed to the horizontal portion 16 of bracket 14.

A coil spring 32 embraces the telescoping members 28 and 29 and serves to restrain the telescoping movement thereof. The arms 11 and 12 may also be fashioned to exert a spring grip on the top portion of the seat back 10.

In use, the device is placed on the top of the seat back 10 adjoining the driver's seat by engaging the arms 11 and 12 thereover. The rider will rest his head against the pads 23 and 24 and during the travel of the vehicle will be able to sleep as the road jolts will be taken up by the combined action of the pads 23 and 24, the resiliency of the frontal coil 17 and the coil spring 32.

It will be understood that the device is capable of many modifications in structure and design, without departing from the spirit of the invention, within the scope of the appended claims.

Having thus described the invention, what is claimed and desired to be secured by Letters Patent of the United States, is:

1. A head-rest for vehicles comprising diverging arms engaged over the top of a seat back, an angular member extending upwardly and forwardly therefrom, a frontal coil thereon, arms secured to the latter, a pair of cushioned head engaging portions fixed thereto, a bar connecting said arms, a telescoping member fixed between said bar and said horizontal portion of said angular member, and a coil spring limiting the compressing action of said telescoping member.

2. A head-rest for vehicles comprising a pair of diverging arms bent to engage over the top of a vehicle seat back fastened together at the back thereof, an angular bracket member extending upwardly and forwardly therefrom, a spring coil disposed frontally thereof, a portion integral with said coil extending upwardly therefrom, means fixed thereto, a pair of head cushions held thereon, an angular bar connecting said head cushions, telescoping members disposed between said bar and the forwardly extending portion of said bracket member, and a coil spring embracing said telescoping members to limit compressing movement of said telescoping members.

HERBERT JAMES SLOWEY.

References Cited in the file of this patent

UNITED STATES PATENTS

| Number | Name | Date |
|---|---|---|
| 236,212 | Cartwright | Jan. 4, 1881 |
| 830,826 | De Fontes | Sept. 11, 1906 |
| 1,471,168 | Katz | Oct. 16, 1923 |
| 2,267,103 | Ireland | Dec. 23, 1941 |
| 2,500,496 | Nickelsen | Mar. 14, 1950 |